Dec. 19, 1933.  I. S. KEELER  1,940,307
DRAWER PULL
Filed Aug. 7, 1933
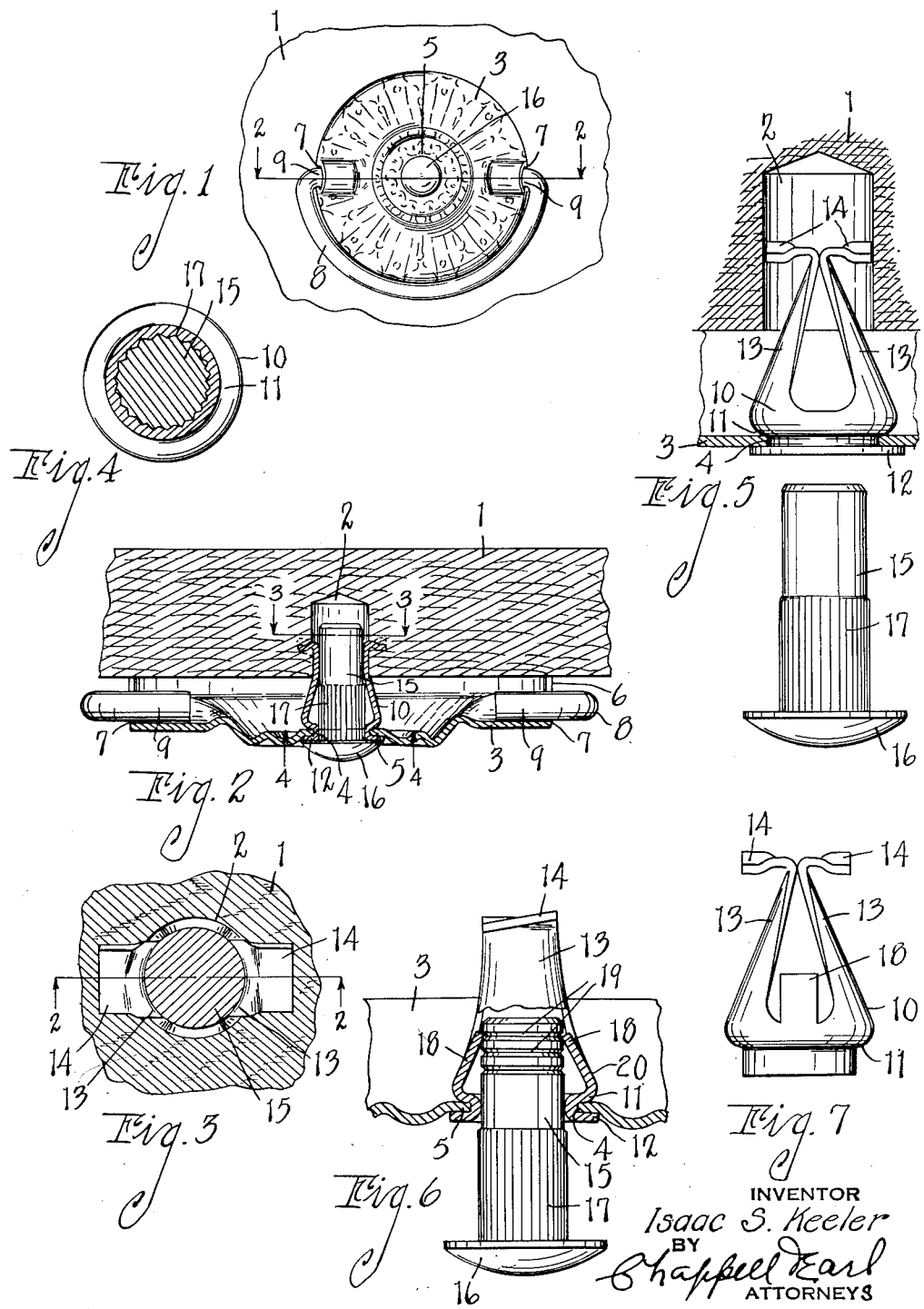
INVENTOR
Isaac S. Keeler
BY
Chappell Earl
ATTORNEYS Patented Dec. 19, 1933

1,940,307

UNITED STATES PATENT OFFICE 1,940,307

DRAWER PULL

Isaac S. Keeler, Grand Rapids, Mich., assignor to Keeler Brass Company, Grand Rapids, Mich.

Application August 7, 1933. Serial No. 683,994

13 Claims. (Cl. 16—126)

The main objects of this invention are:

First, to provide a pull for drawers and the like having improved fastening means which is very strong and secure and prevents rotation of the pull relative to the supporting panel, the fastening means terminating within the panel, thereby obviating unsightly screws on the inner side of the panel.

Second, to provide a drawer pull of this character which may be rapidly assembled and attached to the drawer panel.

Third, to provide a pull having the above desirable features and characteristics, which is simple and economical in its parts and very efficient in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary front elevational view of a drawer having a drawer pull embodying the features of my invention.

Fig. 2 is an enlarged detail view mainly in section on a line corresponding to line 2—2 of Figs. 1 and 3.

Fig. 3 is an enlarged detail sectional view on a line corresponding to line 3—3 of Fig. 2.

Fig. 4 is an enlarged sectional view on a line corresponding to line 4—4 of Fig. 2.

Fig. 5 is a view of the parts in position for assembly, portions being shown in section.

Fig. 6 is a fragmentary sectional view of a modification of my invention.

Fig. 7 is a side view of the connection or anchoring member of the modification.

In the embodiment of my invention illustrated by Figs. 1 to 5, inclusive, of the drawing numeral 1 indicates a panel such as the front wall of a drawer having a bore or socket 2 preferably opening to the front only. The escutcheon 3 has a central aperture 4 surrounded by an inset annular flange 5 and an annular peripheral flange 6 provided with opposed side openings 7, 7. The handle or bail 8 has inturned pivot ends 9, 9 pivotally received by the openings 7, 7.

A connecting or anchoring member 10 is arranged within the central aperture 5 of the escutcheon and has an annular shoulder 11 abutting the rear and an annular flange 12 overlapping the front of the inset flange 4 and converging resilient jaws 13, 13 terminating in lugs or out-turned teeth 14, 14. The jaws are adapted to extend into the socket so as to position the teeth for biting or embedding, when the jaws are expanded, into the panel which is preferably of wood.

The pin 15 is driven into the connecting member to expand the jaws and cause their teeth to engage the panel at opposite sides of the socket, the pin having a head 16 for limiting the inward movement thereof and a longitudinally knurled shank portion 17 adapted to frictionally engage the connecting member within the central aperture to hold the pin in place when driven home.

The teeth are arranged in angular relation to each other to engage the panel to resist rotation of the connecting member relative to the panel and to prevent them from cutting screw threads in the wall of the socket when the connecting member is rotated. By balancing the teeth one against the other more effective anchoring results and different portions or layers of the grain of the wood are engaged, and, further, a great resistance to twisting or turning of the pull is provided. The pull is assembled with the panel by merely locating the jaws of the connecting or anchoring member within the socket and then driving the pin home.

In the modification of my invention illustrated by Figs. 6 and 7 of the drawing, the connecting member 20 is provided with opposed lugs 18, 18 between the jaws to hold the pin 15 in assembled relation therewith during shipment, the inner end of the pin being provided with one or more annular grooves 19 for selective coaction with the free ends of the lugs. In this case the pin is assembled with the connecting member by merely pushing it into the point where the lugs engage one of the grooves 19. This prevents the parts from being lost in shipment and requires only the driving of the pin home to complete the assembly of the pull with the panel. Otherwise, the pull is similar to the one described in connection with Figs. 1 to 5, inclusive.

Pulls manufactured in accordance with my invention are not only inexpensive to manufacture, but they are also quickly and inexpensively attached to the furniture, the latter being provided with sockets for receiving the connecting members of the pulls. In operation my pulls effectively resist turning and cannot be removed from the panel without first taking out the expanding pin. The head of the pin coacts with the inset flange surrounding the central aperture of the escutcheon to conceal the flange at the outer end of the connecting member so that the pull is very attractive in appearance.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention what I claim as new and desire to secure by Letters Patent is:

1. A pull for a wood panel having a socket opening to the front, comprising in combination an escutcheon having a central aperture surrounded by an inset annular flange and an annular peripheral flange, a connecting member fitting within said central aperture and having an annular shoulder abutting the rear and an annular flange overlapping the front of said inset flange and converging resilient jaws extending into the socket and terminating in out-turned teeth engaging the panel at opposite sides of the socket, the teeth being arranged in opposed angular relation to each other to resist rotation of the connecting member relative to the panel and to prevent them from cutting screw threads in the wall of the socket when the connecting member is rotated, and a pin acting to hold said jaws expanded with their teeth biting into the panel at opposite sides of the socket and having a longitudinally knurled portion frictionally engaging said connecting member within said aperture and a head resting on the flange of said connecting member and coacting with said inset flange to conceal the same.

2. A pull for a wood panel having a socket opening to the front, comprising in combination an escutcheon having a central aperture, a connecting member fitting within said central aperture and having converging resilient jaws extending into the socket and terminating in out-turned teeth engaging the panel at opposite sides of the socket, the teeth being arranged in opposed angular relation to each other to resist rotation of the connecting member relative to the panel and to prevent them from cutting screw threads in the wall of the socket when the connecting member is rotated, and a pin acting to hold said jaws expanded with their teeth biting into the panel at opposite sides of the socket.

3. A pull for a panel having a socket opening to the front, comprising in combination an escutcheon having an aperture, a connecting member secured within said aperture and having a shoulder abutting the rear and converging resilient jaws extending into the socket and terminating in out-turned teeth engaging the panel at opposite sides of the socket, a pin acting to hold said jaws expanded with their teeth biting into the panel at opposite sides of the socket and having a longitudinally knurled portion frictionally engaging said connecting member within said aperture and a head resting on the flange of said connecting member and coacting with said inset flange to conceal the same.

4. A pull for a panel having a socket opening to the front, comprising in combination an escutcheon having an aperture, a connecting member secured within said aperture and having converging resilient jaws extending into the socket and terminating in out-turned teeth engaging the panel at opposite sides of the socket, and a pin acting to hold said jaws expanded with their teeth biting into the panel at opposite sides of the socket and having a head resting on the flange of said connecting member and coacting with said inset flange to conceal the same.

5. A pull comprising in combination an escutcheon having a central aperture surrounded by an inset annular flange, a connecting member fitting within said central aperture and having an annular shoulder abutting the rear and an annular flange overlapping the front of said inset flange and converging resilient jaws terminating in out-turned teeth, the teeth being arranged in angular relation to each other, and a pin acting to hold said jaws expanded having a longitudinally knurled portion frictionally engaging said connecting member within said aperture and a head resting on the flange of said connecting member and coacting with said inset flange to conceal the same.

6. A pull comprising in combination an escutcheon having a central aperture, a connecting member fixed to said escutcheon within said aperture and having converging resilient jaws adapted to reach within a bore or socket and terminating in out-turned teeth adapted to bite into the walls of the socket at opposite sides, said connecting member having converging lugs between said jaws, and a pin arranged within said connecting member and having spaced annular grooves for selective coaction with said lugs to hold the parts in temporary assembled relation, said pin being adapted when driven home to expand said jaws to cause their teeth to engage the panel at opposite sides of the socket, the pin having a head adapted to limit the inward movement thereof and a longitudinally knurled portion adapted to frictionally engage said connecting member to hold the pin in place when driven home.

7. A pull comprising in combination an escutcheon having a central aperture, a connecting member fixed to said escutcheon within said aperture and having converging resilient jaws adapted to reach within a bore or socket and terminating in out-turned teeth adapted to bite into the walls of the socket at opposite sides, said connecting member having converging lugs between said jaws, and a pin arranged within said connecting member and having spaced annular grooves for selective coaction with said lugs to hold the parts in temporary assembled relation, said pin being adapted when driven home to expand said jaws to cause their teeth to engage the panel at opposite side of the socket, the pin having a head adapted to limit the inward movement thereof.

8. A pull comprising in combination an escutcheon having a central aperture, a connecting member fixed to said escutcheon within said aperture and having converging resilient jaws adapted to reach within a bore or socket and terminating in out-turned teeth adapted to bite into the walls of the socket at opposite sides, and a pin arranged within said connecting member, said pin being adapted when driven home to expand said jaws to cause their teeth to engage the panel at opposite sides of the socket, the pin having a head adapted to limit the inward movement thereof.

9. A pull comprising in combination an escutcheon having an aperture, a connecting member fixed to said escutcheon within said aperture and having converging resilient jaws adapted to reach within a socket and terminating in out-turned teeth adapted to bite into the panel at opposite sides of the socket, said connecting member having converging lugs between said jaws, and a pin arranged within said connecting member and having an annular groove for coaction with said lugs to hold the parts in temporary assembled relation, said pin being adapted when driven home to expand said jaws to cause their teeth to engage the panel at opposite sides of the socket.

10. A pull comprising in combination an escutcheon having an aperture, a connecting member fixed to said escutcheon within said aperture and having converging resilient jaws adapted to reach within a socket and terminating in out-turned oppositely inclined teeth adapted to bite into the panel at opposite sides of the socket, and a pin arranged within said connecting member adapted when driven home to expand said jaws to cause their teeth to engage the panel at opposite sides of the socket.

11. A pull comprising in combination an escutcheon having a central aperture, a connecting member fixed to said escutcheon within said aperture and having converging resilient jaws terminating in out-turned teeth, and a pin arranged within said connecting member and adapted when driven home to expand said jaws, the pin having a head adapted to limit the inward movement thereof and a longitudinally knurled portion adapted to frictionally engage said connecting member to hold the pin in place when driven home.

12. A pull comprising in combination an escutcheon having a central aperture, a connecting member fixed to said escutcheon within said aperture and having converging resilient jaws terminating in out-turned teeth, and a pin arranged within said connecting member and adapted when driven home to expand said jaws.

13. A device of the class described for a wall having a socket, comprising a connecting member having converging resilient jaws extending into the socket and terminating in out-turned teeth engaging the wall at opposite sides of the socket, the teeth being arranged in opposed angular relation to each other to resist rotation of the connecting member relative to the wall, and a pin acting to hold said jaws expanded and having a flange overlapping the exposed end of said connecting member to limit the inward movement of the pin.

ISAAC S. KEELER.